United States Patent [19]

Umehara

[11] 4,313,551
[45] Feb. 2, 1982

[54] TAPE GUIDE APPARATUS

[76] Inventor: Yozaburu Umehara, 2-8-6, Shakujiimachi, Nerima-ku, Japan

[21] Appl. No.: 190,755

[22] Filed: Sep. 25, 1980

Related U.S. Application Data

[62] Division of Ser. No. 940,198, Sep. 7, 1978, Pat. No. 4,228,940.

[30] Foreign Application Priority Data

Sep. 14, 1977 [JP] Japan .................................. 52-124344
Mar. 3, 1978 [JP] Japan .................................. 53-24344

[51] Int. Cl.³ ...................... B65H 23/04; B65H 27/00
[52] U.S. Cl. ..................................... 226/196; 242/76; 242/157 R; 242/199
[58] Field of Search ....................... 226/196, 197, 199; 242/76, 199, 157 R

[56] References Cited

U.S. PATENT DOCUMENTS 3,598,332 8/1971 Sharkey ........................... 226/196 X
4,168,043 9/1979 Shiba ................................... 242/199

Primary Examiner—Stanley N. Gilreath
Attorney, Agent, or Firm—Karl F. Ross

[57] ABSTRACT

A tape guide pin for recording and/or reproducing apparatus includes a base body made of non-magnetic material; and a surface layer formed on the base body, made of non-magnetic hard material, the surface layer having the surface roughness whose microscopic tips are rounded. A method of manufacturing the tape guide pin for recording and/or reproducing apparatus includes the steps of: forming a base body of non-magnetic material; forming a surface layer of non-magnetic hard material on the base body; subjecting the base body and/or the surface layer to surface treatment for dimensional accuracy of circumferential surface; and fine-finishing for rounding the microscopic tips of the surface roughness formed by the surface treatment for dimensional accuracy.

1 Claim, 9 Drawing Figures

AXIAL DIRECTION

AXIAL DIRECTION

TAPE GUIDE APPARATUS

This is a division of application Ser. No. 940,198, filed Sept. 7, 1978, now U.S. Pat. No. 4,228,940.

FIELD OF THE INVENTION

This invention relates to tape guide means or apparatus for recording and/or reproducing purpose.

BACKGROUND OF THE INVENTION

Generally, a video tape recorder (VTR) includes a tape cassette in which a magnetic tape is wound on reels. Methods for loading a rotary drum assembly of the VTR with the magnetic tape and unloading the magnetic tape from the rotary drum assembly are divided into two main classes. However, in both of the two classes, the magnetic tape is drawn from one reel, and it is taken up by the other reel, guided by tape guide pins during the recording or reproducing operation to record or reproduce signals on or from the magnetic tape. Parts for running and guiding the magnetic tape should be accurate to obtain a well-reproduced picture. Particularly, the tape guide pins are important from the viewpoint of the accurate running of the magnetic tape, since the magnetic tape is guided in contact with the tape guide pins. The quality of the tape guide pin greatly influences the performance of the video tape recorder.

Most of the tape guide pins in present video tape recorders are made of austenitic stainless steel SUS 316. The structure of this material may be partially changed from austenite into pseudo-martensite by working process such as plastic working, cutting and grinding, and the material may become weakly magnetic. Magnetic tape guide pins have a bad effect on video signals on the magnetic tape.

The cylindrical surface of a ground and super-finished tape guide pin has microscopically peaked or pointed roughness or unevenness. These microscopic peaks or points of roughness can be smashed or squashed when the cylindrical surface of the tape guide pin is further burnished. Moreover, the hardness of the tape guide pin cannot be significantly increased owing to the magnetism of the material of the pin. The Vickers hardness of the tape guide pin is usually within the range of 280 to 380 Hv; thus, the pin is rather soft.

Accordingly, there is the risk that the back surface of the magnetic tape or the magnetic film thereof maybe damaged or scratched by the above described tape guide pin on which the magnetic tape slides. The life of the magnetic tape in such event would be shortened.

OBJECT OF THE INVENTION

It is an object of this invention to provide a tape guide apparatus for recording and/or reproducing purposes which overcomes the enumerated defects of the above-described tape guide pin.

Another object of this invention is to provide tape guide means for a recording and/or reproducing apparatus by which a tape sliding thereon can be effectively prevented from being damaged.

A further object of this invention is to provide tape guide means for a recording and/or reproducing apparatus on which a tape can slide very smoothly.

A still further object of this invention is to provide tape guide means for a recording and/or reproducing apparatus which can prolong the life of the tape sliding thereon.

SUMMARY OF THE INVENTION

In accordance with an aspect of this invention, a tape guide pin for recording and/or reproducing apparatus includes a base body made of non-magnetic material; and a surface layer formed on the base body, made of non-magnetic hard material, the surface layer having the surface roughness whose microscopic tips are rounded. The tape guide pin for a recording and/or reproducing apparatus comprises a base body of non-magnetic material, and a surface layer of non-magnetic hard material formed on the base body; the base body and/or the surface layer is subjected to surface treatment for obtaining dimensional accuracy of the circumferential surface and to fine-finishing for rounding the microscopic tips of the surface roughness formed by that surface treatment for dimensional accuracy.

In this specification, the "hard" material of the surface layer means that the hardness of the surface layer is larger than at least the hardness of the base body. The recording and/or reproducing apparatus disclosed in this specification includes, for example, a video tape recorder and a tape cassette loaded in the video tape recorder.

Various other objects, advantages and features of the present invention will become readily apparent from the ensuing detailed description, and the novel features will be particularly pointed out in the appended claims.

DESCRIPTION OF THE PREFERRED EMBODIMENTS

According to this invention, a base body of a tape guide is made of perfectly non-magnetic material such as austenitic stainless steel SUS 316. The base body of the tape guide means is plated with non-magnetizable metal or a metal which is hard to magnetize such as chromium, so as to form a hard metal surface layer on the base body of the tape guide means. The non-magnetic base body of the tape guide means may be soft. However, the surface layer of the tape guide means should be hard. The tape guide pin is thus of a double-layer structure. The surface of the tape guide means is ground (outer-diameter grinding), and then it is so burnished as to round the microscopic tips of the surface roughness as the fine-finishing step. Thus, the frictional resistance between the tape guide means and the magnetic tape sliding thereon is reduced.

According to this invention, the magnetic tape smoothly slides on the tape guide means in contact with the rounded tips of the surface roughness. Damage to or scratching of the back surface of the magnetic tape or the magnetic film thereof is thus effectively avoided. With conventional tape guide means, the microscopic tips of the surface roughness are pointed or peaked so as to cause damage to the magnetic tape sliding thereon. When the microscopic tips of the surface roughness are squashed or smashed by the burnishing operation, they become worn down through contact with the running magnetic tape inasmuch as the conventional tape guide means is made of relatively soft material. Accordingly, the microscopic tips of the surface roughness are edged, peaked or pointed by the running magnetic tape, resulting in damage to the latter. Further, hard dust is apt to adhere to the microscopic flat surfaces of the surface roughness formed by wearing, similarly resulting in damage to the magnetic tape.

On the other hand, according to this invention, since the surface layer is made of hard material and the microscopic tips of the surface roughness are rounded, the microscopic tips are hard to wear. This is because the magnetic tape always makes smooth contact with the tape guide means and slides smoothly thereon.

If the microscopic tips of the surface roughness are not rounded, or are flat, the magnetic tape would be damaged by the hard edges of the surface roughness, or dust is apt to adhere to the flat tips of the surface roughness.

Moreover, since the base body of the tape guide means is made of non-magnetic material, and the outer layer is made of substantially non-magnetic hard material, the tape guide means according to this invention has little influence on the video signals on the magnetic tape.

Figure 1A:
FIGS. 1A, FIG. 1B and FIG. 1C are perspective views of tape guide pins according to three embodiments of this invention.
Figure 1B:
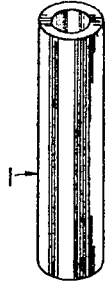
Figure 1C:
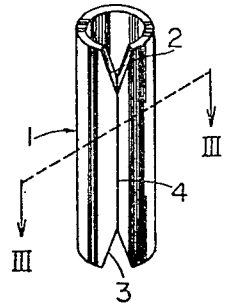

The tape guide means according to this invention may be in the form of a solid rod, a pipe or a rolled piece as shown in FIG. 1A, FIG. 1B or FIG. 1C. Besides the above described stainless steel, austenitic stainless steel SUS 304, aluminium alloy or copper alloy may be used as non-magnetic material for the base body of the tape guide. The surface layer may be made of any other non-magnetic material than chromium. However, it is required for the smooth running of the tape that the Vickers hardness of the surface layer be higher than 400 Hv, i.e. should be within the range of 400 to 1000 Hv (preferably 600 to 700 Hv). Beyond the above-described range of the Vickers hardness, the running performance of the magnetic tape tends to deteriorate. When the Vickers hardness is too high, the magnetic tape is rather damaged by the tape guide. It is preferable that the surface roughness of the hard surface layer after the outer-diameter grinding be within the range of 0.2 to 0.6 S (according to JIS-Japanese Industrial Standards-B0601-1970: the same shall apply hereinafter). The range of 0.2 to 0.6 S means that the maximum height of the surface-roughness formations is the range of 0.2 to 0.6μRmax in the metric system. When the surface roughness of the surface layer of the tape guide is less than 0.2μRmax, the microscopic surface is too flat, and the smooth running of the magnetic tape is apt to be difficult. When the surface roughness of the surface layer of the tape guide means is more than 0.6μ Rmax, the microscopic tips of the surface roughness are too sharp, and the magnetic tape is apt to be damaged by the sharp tips of the surface roughness.

Next, embodiments of this invention which will be applied to tape guide pins in a video tape recorder, will be described with reference to the drawing.

The shapes of the tape guides usable in the VTR are shown in FIG. 1A, FIG. 1B and FIG. 1C. FIG. 1A shows a tape guide pin 1 in the form of a solid rod. FIG. 1B shows a tape guide pin 1 in the form of a pipe. And FIG. 1C shows a tape guide pin 1 in the form of a rolled piece. V-shaped cutout portions 2 and 3 are made in the upper and lower ends of the tape guide pin 1 shown in FIG. 1C. The tape guide pin 1 of FIG. 1C is formed by rolling a sheet material shown in FIG. 2A. The sheet material is cut at the four corners corresponding to the V-shaped cutout portions 2 and 3. Opposite edges 4a and 4b are abutted with each other in the rolling operation of the sheet material. An abutting surface 4 between the edges 4a and 4b can be easily recognized by the V-shaped cutout portions 2 and 3. The tape guide pin 1 of FIG. 1C is firmly fitted at one of the V-shaped cutout portions 2 and 3 to a triangular projection 26a of a tape guide post 26 formed on a tape cassette in the VTR, as shown in FIG. 2B, in the assembling operation. Since the cutout portions 2 and 3 are made at both ends of the tape guide pin 1 of FIG. 1C, it is not necessary to distinguish the ends of the tape guide pin 1 in the automatic assembling operation. Preferably, the tape guide pin 1 of FIG. 1C is so arranged in the tape cassette that any portion of the tape guide pin 1 other than the abutting surface 4 thereof contacts the magnetic tape. The tape guide pin 1 of FIG. 1C is plated with hard chromium as described below. However, even the tape guide pin 1 of FIG. 1C not plated with hard chromium has the above described merits. The cutout portions 2 and 3 may be in any shape other than V-shape. For example, the cutouts may be rectangular.

Figure 3:
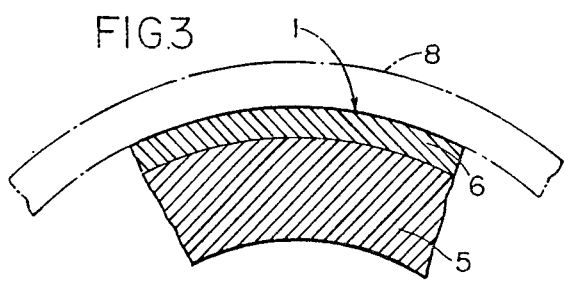
FIG. 3 is an enlarged cross-sectional view of a part of the tape guide pin of FIG. 1C, taken along the line III—III of FIG. 1C.
Figure 4:
FIG. 4 is a schematic and microscopic view of a pattern of the surface roughness of the tape guide pin according to the embodiment of this invention, measured by a surface roughness meter.

An internal structure of the tape guide pin 1 of FIG. 1C is shown in FIG. 3 which is an enlarged cross-sectional view of the tape guide pin 1 taken along the line III—III of FIG. 1C. A base body 5 of the tape guide pin 1 is made of non-magnetic austenitic stainless steel, for example, SUS 316 which includes less than 0.08%, C, 16~18% Cr, 10~14% Ni and 2~3% Mo. The structure of the stainless steel SUS 316 is originally in austenite. However, it has the possibility to change from austenite into pseudo-martensite by a working operation. The pseudo-martensite is magnetic. The stainless steel SUS 316 is non-magnetic only below the working degree of 40% and tensile strength of 122 kg/mm². When the tape guide pin of the stainless steel SUS 316 is worked beyond the working degree of 40%, the stainless steel SUS 316 changes from non-magnetic material into weakly magnetic material. It is for demagnetizing the tape guide pin it is heated to a temperature higher than about 1050° C. to render austenite structure into solid solution. However, in such heat treatment, the stainless steel is softened to the Vickers hardness of 200 Hv, and it becomes easy to wear by friction. Such a tape guide is not usable. According to the embodiments of this inventon, a hard chromium layer 6 is formed on the base body 5 to increase the surface hardness of the tape guide pin 1. The layer 6 has the hardness of more than 600 Hv. The surface of the tape guide pin 1 which has been treated as described hereinafter, is so treated as to have the microscopic roughness shown in FIG. 4. The hardness of the electroplate layer 6 can be controlled with current density of electroplating bath, temperature thereof, and the distance between the electrodes in the electroplating bath. The pattern of the surface roughness as shown in FIG. 4 is not always continuous in the axial direction of the tape guide pin 1. Although not shown, some of the microscopic tips of the surface roughness are nearly perpendicular to the axial direction, or inclined to the axial direction.

Next, a method of manufacturing the tape guide pin 1 will be described in detail.

Figure 2A:
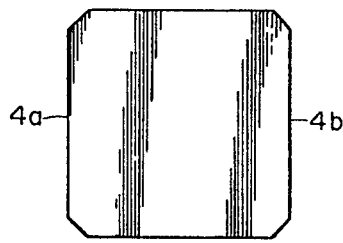
FIG. 2A is a plan view of a sheet material for the tape guide pin of FIG. 1C.
Figure 2B:
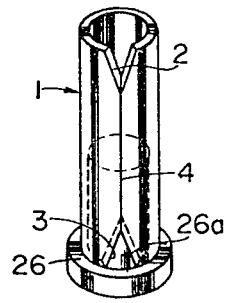
FIG. 2B is a perspective view of the tape guide pin of FIG. 1C fitted to a guide post in a tape cassette in a video tape recorder.

The tape guide pin 1 of FIG. 1A or FIG. 1B is obtained by cutting a long stainless steel material whereas the tape guide pin of FIG. 1C is obtained by rolling the stainless steel sheet material of FIG. 2A. Next, the circumferential surface of the tape guide pin 1 is ground (outer-diameter grinding), for example, by a centerless grinding method, and it is lapped. It is required that the surface roughness of the tape guide pin 1 be lower than about $0.6\mu$ Rmax in this manufacturing stage. It is moreover preferable that the surface roughness of the tape guide pin 1 be lower than $0.3\mu$ Rmax. In the centerless grinding method, the tape guide pin 1 is ground between a rotating abrasive wheel and another rotating rubber wheel, running along the support arranged in the space between the rotating abrasive wheel and the rotating rubber wheel. The tape guide pin 1 to be ground runs through the stretch of the support for above ten seconds, being ground by the rotating rubber wheel and the rotating abrasive wheel which rotate at the speed ratio of $\frac{1}{3} \sim \frac{1}{4}$ in the same direction. For example, the rotational speed of the abrasive wheel is about 1500 r.p.m. while that of the rubber wheel is about 500 r.p.m. The tape guide pin 1 is supplied to one end of the support between the rubber wheel and the abrasive wheel, and it is discharged from another end of the support. The tape guide pin 1 is once or twice introduced to the support.

Next, the tape guide pin 1 is heated up at a temperature of 1050° C. for demagnetization. The structure of the base body 5 then becomes perfectly non-magnetic austenite. The chromium electroplate layer 6 having a hardness of more than 600 Hv is formed on the base body 5 to the depth of 1 to $18\mu$, or preferably 4 to $7\mu$. Thus, there is obtained a perfectly non-magnetic tape guide pin 1 consisting of the base body 5 with hardness of less than 200 Hv and the surface layer 6 with hardness of more than 600 Hv. Further, the circumferential surface of the tape guide pin 1 is so ground by the centerless grinding method that the surface roughness of the tape guide pin 1 becomes 0.6 to $0.2\mu$ Rmax, or considerably lower than $0.5\mu$ Rmax. Then, the microscopic tips of the surface roughness of the tape guide pin 1 are rounded by a barrel grinding method (particularly for a surface roughness of lower than $0.5\mu$ Rmax), a buffing method, and a chemical polishing or burnishing method as a fine-finishing step, while the surface roughness of the tape guide pin 1 is maintained at the value of 0.6 to $0.2\mu$ Rmax, as shown in FIG. 4. The circumferential surface of the tape guide pin 1 is not perfectly ground by the above described method, since the microscopic tips of the surface roughness are merely rounded.

For example, a rotary drum containing abrasives is used in the barrel grinding method while a cloth roll with abrasives is used in the buffing method. In both of these methods, it is preferable that the finishing grind time of the tape guide pin 1 be one eighth to one fifteenth as long as the time required to perfectly grind the tape guide pin 1. When the finishing grind time of the tape guide pin 1 is too short, the microscopic tips of the surface roughness are not sufficiently rounded. On the other hand, when the finishing grind time of the tape guide pin 1 is too long, the microscopic tips of the surface roughness are flattened. One or the other result is not desirable.

Figure 5:
FIG. 5 is a schematic and microscopic view of a pattern of the surface roughness of a conventional tape guide pin, measured by the surface roughness meter.

The thus manufactured tape guide pin 1 has no adverse effect on the signals recorded on the magnetic tape, since the tape guide pin 1 is perfectly non-magnetic. The surface layer of the tape guide pin 1 is so hard such that it has a Vickers hardness of higher than 600 Hv. The microscopic tips of the surface roughness are rounded as shown by reference numeral 7 in FIG. 4. Accordingly, the sliding frictional resistance between the magnetic tape 8 shown by the dot-dash line in FIG. 3 and the tape guide pin 1 is very little, and the running magnetic tape is hard to wear out. The microscopic tips of the surface roughness of the conventional tape guide pin 1 are pointed or sharpened as shown by reference numeral 9 in FIG. 5. Accordingly, when the conventional tape guide pin is used, scratch damage is observed in the magnetic tape 8, before the running number of the magnetic tape 8 becomes ten in the VTR. On the other hand, when the tape guide pin 1 according to this invention is used, scratch damage is not observed in the magnetic tape 8, even when the running number of the magnetic tape 8 becomes more than ten. The life of the magnetic tape 8 is prolonged.

Figure 6:
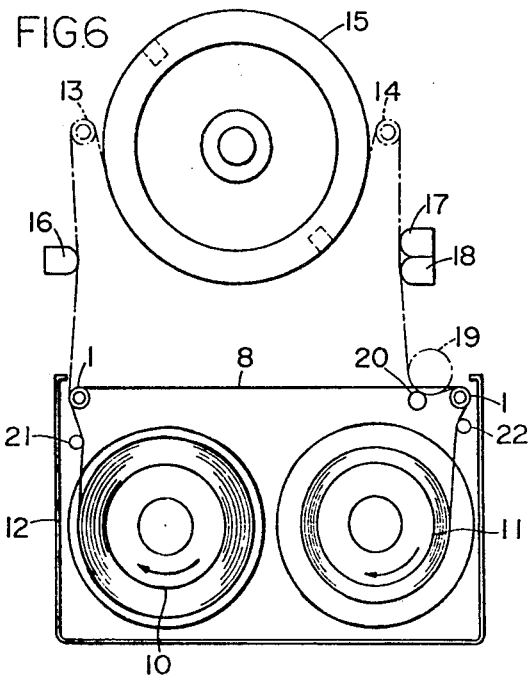
FIG. 6 is a schematic plan view of a video tape recorder to which the tape guide pin according to the embodiment of this invention is applied

FIG. 6 is a schematic plan view of the VTR in which the tape guide pins 1 according to this invention are assembled into a tape cassette. Referring to FIG. 6, the magnetic tape 8 from a supply reel 10 runs through tape guide pins 21, 1 and 22 to a take-up reel 11 to be taken up by the latter. In the loading condition, the magnetic tape 8 is applied to a rotary drum assembly 15 by loading poles 13 and 14 in the manner shown by the dot-dash line in FIG. 6. The tape 8 contacts also with a full-width erasing head 16, a sound-erasing head 17 and a sound control head 18, and it is pressed between a pinch roller 19 and a capstan 20 to be driven thereby, as is well known.

As above described, the surface layer of the tape guide pin 1 is made of hard chromium electroplate, and it has the surface roughness as shown in FIG. 4. The magnetic tape 8 is guided by the tape guide pin 1, sliding thereon. The tape guide pin 21 at the supply reel side contacts the magnetic film of the magnetic tape 8, while the tape guide pin 1 contacts the non-magnetic back surface of the magnetic tape 8. When the tape guide pin 21 is manufactured in the same manner as the tape guide pin 1 the magnetic tape 8 is not damaged by the tape guide pin 21. The conventional tape guide pin damages particularly the magnetic film of the magnetic tape. Such defect can be avoided by the tape guide pin according to this invention. The tape guide pin 22 at the take-up reel side does not always need to be manufactured in the same manner as the tape guide pin 1 according to this invention. For example, the tape guide pin 22 may be manufactured in such a manner that a pipe formed of plastics is fitted to a non-magnetic guide post.

Although illustrative embodiments of the invention have been described in detail herein with reference to the accompanying drawing, it is to be understood that the invention is not limited to those precise embodiments, and that various changes and modifications can be effected therein by one skilled in the art without departing from the scope and spirit of the invention as defined in the appended claims.

For example, the surface layer 6 may be formed on the base body 5 by any method other then the electroplating method. Further, the surface layer 6 and the base body 5 may be made of the same material. Although the surface treatment for dimensional accuracy of circumferential surface is carried out both before the electroplating operation and after the electroplating operation in the above-described embodiment, it may be carried out only before or after the electroplating operation. Further, although the above described tape guide pin is circular in cross section, it may be different, for example, semicircular in cross section. This invention may be applied to any other recording and/or reproducing apparatus than the video tape recorder, for example, it may be applied to a projector in which a film corresponds to the tape.

What is claimed is:

1. A tape guide comprising a base body formed into a tube, said base body having at the both ends a pair of cutout portions of substantially isosceles triangular-shape which are symmetrically arranged along the axial direction of said base body, and said base body further having a slit extending between the opposite vertexes of said cutout portion and at which the opposite abutment edges of a sheet rolled to form said base body engage closely.

* * * * *

UNITED STATES PATENT AND TRADEMARK OFFICE
CERTIFICATE OF CORRECTION

PATENT NO. : 4 313 551
DATED : 2 February 1982
INVENTOR(S) : Yozaburo Umehara

It is certified that error appears in the above-identified patent and that said Letters Patent are hereby corrected as shown below:

Change the inventor's first name to read:

-- YOZABURO --.

Signed and Sealed this

Thirteenth Day of July 1982

[SEAL]

Attest:

Attesting Officer

GERALD J. MOSSINGHOFF

Commissioner of Patents and Trademarks